US010943288B2

(12) United States Patent
Li et al.

(10) Patent No.: US 10,943,288 B2
(45) Date of Patent: Mar. 9, 2021

(54) COGNITIVE ARTICLE RECEPTION

(71) Applicant: International Business Machines Corporation, Armonk, NY (US)

(72) Inventors: Jialin Li, Westford, MA (US); Pradeep K. Nanjundaswamy, Bangalore (IN); Srikanth Sundararajan, Cambridge, MA (US); Danai Tengtrakool, Burlington, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 269 days.

(21) Appl. No.: 15/473,864

(22) Filed: Mar. 30, 2017

(65) Prior Publication Data

US 2018/0285960 A1    Oct. 4, 2018

(51) Int. Cl.
*G06Q 30/00* (2012.01)
*G06Q 30/06* (2012.01)
*G06N 20/00* (2019.01)
*H04W 4/02* (2018.01)

(52) U.S. Cl.
CPC ......... *G06Q 30/0635* (2013.01); *G06N 20/00* (2019.01); *H04W 4/023* (2013.01)

(58) Field of Classification Search
CPC .................................................... G06Q 30/00
See application file for complete search history.

(56) References Cited

U.S. PATENT DOCUMENTS

| 7,974,873 | B2 | 7/2011 | Simmons et al. | |
| 9,172,738 | B1* | 10/2015 | daCosta | H04L 67/00 |
| 10,032,144 | B1* | 7/2018 | Jacob | G06Q 20/102 |
| 2008/0195312 | A1* | 8/2008 | Aaron | G06Q 30/0201 |
| | | | | 455/418 |
| 2008/0300996 | A1* | 12/2008 | Fei | G06Q 30/0601 |
| | | | | 705/26.8 |
| 2011/0178960 | A1 | 7/2011 | Dever et al. | |

(Continued)

OTHER PUBLICATIONS

Perez, S., & Perez, S. (Mar. 15, 2017). McDonald's begins testing Mobile Order & Pay ahead of nationwide launch—TechCrunch. Retrieved from https://techcrunch.com/2017/03/15/mcdonalds-begins-testing-mobile-order-pay-ahead-of-nationwide-launch/ (Year: 2017).*

(Continued)

*Primary Examiner* — Abby J Flynn
(74) *Attorney, Agent, or Firm* — Stephanie Carusillo, Esq.; George S. Blasiak, Esq.; Heslin Rothenberg Farley & Mesiti P.C.

(57) ABSTRACT

Methods, computer program products, and systems are presented. The method computer program products, and systems can include, for instance: receiving a request from a customer user for reception of an item by the customer user at a retail venue and data specifying a current physical location of the customer user relative to the retail venue; predicting based on the current physical location of the customer user and historical data of the customer user a time of arrival of the customer user at the retail venue; and outputting a notification to the customer user based on the predicting, the notification including timing information of the reception.

19 Claims, 8 Drawing Sheets

(56) References Cited

U.S. PATENT DOCUMENTS

| | | | |
|---|---|---|---|
| 2012/0101956 A1* | 4/2012 | Hyre | G06Q 10/087 |
| | | | 705/330 |
| 2012/0197670 A1* | 8/2012 | Poon | G06Q 10/02 |
| | | | 705/5 |
| 2014/0278466 A1* | 9/2014 | Simmons | G06F 19/3456 |
| | | | 705/2 |
| 2014/0324843 A1* | 10/2014 | Rapoport | G06F 16/58 |
| | | | 707/724 |
| 2015/0095199 A1 | 4/2015 | Blair, II | |
| 2015/0310536 A1 | 10/2015 | Brady et al. | |
| 2016/0092969 A1 | 3/2016 | Gopalsamy et al. | |
| 2016/0171424 A1* | 6/2016 | Kannan | G06Q 10/063118 |
| | | | 705/7.17 |
| 2016/0171592 A1* | 6/2016 | Pugh | G06Q 30/0635 |
| | | | 705/26.81 |
| 2016/0203543 A1 | 7/2016 | Snow et al. | |
| 2016/0247113 A1* | 8/2016 | Rademaker | G06Q 10/063114 |
| 2017/0098264 A1* | 4/2017 | Priebatsch | H04W 4/21 |
| 2018/0121606 A1* | 5/2018 | Allen | G16H 50/20 |

OTHER PUBLICATIONS

Perez, Sarah. "CVS invests in Curbside to bring mobile orders and store pickups to its retail stores." Apr. 19, 2016. <https://techcrunch.com> (Year: 2016).*

Smith, Aaron. "Taco Bell's new app to deliver fast food faster." Oct. 28, 2014. <https://money.cnn.com/2014/10/28/news/companies/taco-bell-app/> (Year: 2014).*

IBM, "Method and Apparatus for Online Shopping with In Store Pickup and Payment," IP.com, IPCOM000010644D, Jan. 2, 2003.

* cited by examiner

COGNITIVE ARTICLE RECEPTION

BACKGROUND

With traditional retail store shopping experiences, a customer selects items at the store by placing them in a shopping cart. The customer moves around the store with the items selected while looking for other items that they also may purchase. When the customer is ready to purchase the selected items, the customer moves to a location of a point of sale terminal. The customer then purchases the items at this point of sale terminal.

In some cases, a customer may wish to purchase more items than can reasonably be purchased using a traditional retail shopping experience at a brick and mortar store. For example, a customer may desire to purchase more items than can be carried in a shopping cart in the store. As another example, the customer may not have sufficient room at home to store items that are purchased from the store.

Retail stores, on occasion, offer customers discounted prices for bulk purchases. Bulk purchasing benefits both the retailer, who makes more sales, and the customer who gets a discounted price. However, customers placing a limited number of items of a particular type in their shopping cart may not be aware of a bulk price offer for the item. Additionally, even if the customer is aware of the bulk price, the customer may choose to ignore the bulk price offer due to limited storage, product expiration dates, and other factors.

One current approach to improving the retail store shopping experience includes having retail store clerks offer shipping to customers for large and heavy items. These items may be, for example, furniture and appliances. This approach is limited in a number of ways. For example, a sufficient number of retail store clerks may not be available to do the work of setting up the shipping of the items. As another example, the additional time spent by store clerks setting up the shipping of the items may be undesirable when compared to time the store clerks spend on other tasks.

Another approach to improving the retail store shopping experience includes having a customer purchase an item for pickup at the retail store. For example, when a large or expensive item is selected, a customer may be directed by the store to pick up the item at a specified location of the store. For example, the customer may be directed to pickup and purchase an item at a customer service desk at the retail store. As another example, the customer may be directed to collect the item, after purchase, at a location of the store suited for pickup of large items. In some cases, selecting items to purchase may be limited to in-store pickup at the time of purchase.

SUMMARY

Shortcomings of the prior art are overcome, and additional advantages are provided, through the provision, in one aspect, of a method. The method can include, for example: receiving a request from a customer user for reception of an item by the customer user at a retail venue and data specifying a current physical location of the customer user relative to the retail venue; predicting based on the current physical location of the customer user and historical data of the customer user a time of arrival of the customer user at the retail venue; and outputting a notification to the customer user based on the predicting, the notification including timing information of the reception.

In another aspect, a computer program product can be provided. The computer program product can include a computer readable storage medium readable by one or more processing unit and storing instructions for execution by one or more processor for performing a method. The method can include, for example: receiving a request from a customer user for reception of an item by the customer user at a retail venue and data specifying a current physical location of the customer user relative to the retail venue; predicting based on the current physical location of the customer user and historical data of the customer user a time of arrival of the customer user at the retail venue; and outputting a notification to the customer user based on the predicting, the notification including timing information of the reception.

In a further aspect, a system can be provided. The system can include, for example a memory. In addition, the system can include one or more processor in communication with the memory. Further, the system can include program instructions executable by the one or more processor via the memory to perform a method. The method can include, for example: receiving a request from a customer user for reception of an item by the customer user at a retail venue and data specifying a current physical location of the customer user relative to the retail venue; predicting based on the current physical location of the customer user and historical data of the customer user a time of arrival of the customer user at the retail venue; and outputting a notification to the customer user based on the predicting, the notification including timing information of the reception.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
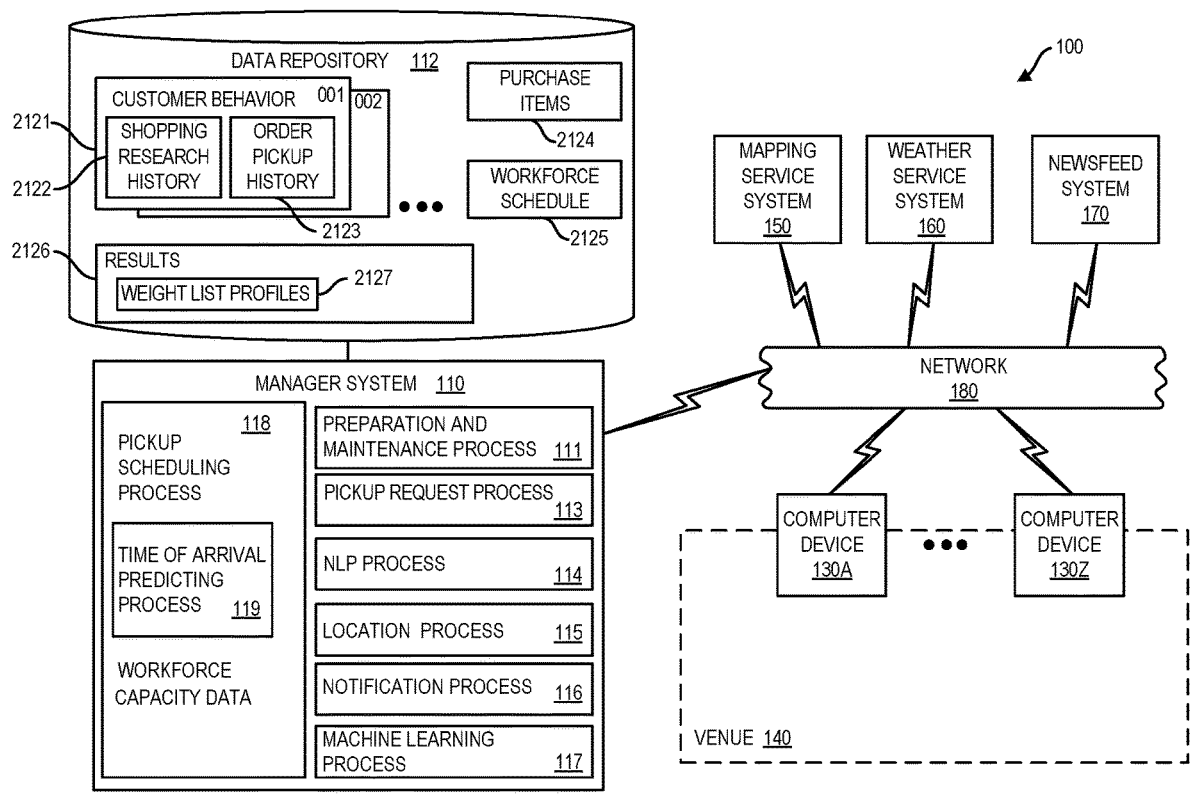
FIG. 1 depicts a system having manager system in one embodiment.

System 100 for use in support of reception of articles provided by purchase items in a retail venue is shown in FIG. 1. System 100 can include manager system 110 having an associated data repository 112, various user computer devices 130A-130Z, a mapping service system 150, a weather service system 160, and a newsfeed system 170. The noted systems and devices can be in communication with one another via a network 180. Each computer of computer devices 130A-130Z can be associated to a certain user of system 100 who can be a registered user of manager system 110. Registered users of manager system 110 can carry their respective computer devices 130A-130Z into and out of retail venue 140. Because computer devices 130A-130Z can be carried into and out of retail venue 140 they are shown in FIG. 1 as being partially disposed internal to and partially disposed external to retail venue 140. Manager system 110, user computer devices 130A-130Z, a mapping service system 150, a weather service system 160, and a newsfeed system 170, can be computing node based systems and devices as set forth herein connected by network 180. For example, network 180 may be a physical network or a virtual network. A physical network can be, for example, a physical telecommunications network connecting numerous computer nodes or systems, such as computer servers and computer clients. By contrast a virtual network can, for example, combine numerous physical networks or parts thereof into a logical virtual network. In another example, numerous virtual networks can be defined over a single physical network.

Manager system 110 can run various processes, including preparation and maintenance process 111, a natural language process (NLP process) 114, a location process 115, a notification process 116, a machine learning process 117, and a pickup scheduling process 118. In one embodiment, pickup scheduling process 118 can activate a time of arrival predicting process 119 and can use workforce capacity data in the performance of determining a pickup schedule.

Regarding data repository 112 of manager system 110, data repository 112 can store various data. Data repository 112 can include customer behavior area 2121 in which data for various customer users of system 100 can be stored. Customer behavior area 2121 can store data for various users e.g. user 001, user 002, and numerous additional users. Customer behavior area 2121 can include shopping research history area 2122 and order pickup history area 2123. Data repository 112 can also include a purchase items area 2124 and a workforce schedule area 2125. Data repository 112 can also include a results area 2126 storing data on results of pickup scheduling processes performed by pickup scheduling process 118. Results area 2126 can include a weight profiles area 2127.

Preparation and maintenance process 111 can be run to prepare and maintain data of data repository 112 for access and use by pickup scheduling process 118. Manager system 110 can run pickup request process 113 to receive requests for pickup of designated purchase items for purchase, NLP process 114 for receiving data to classify received data into various data classifications such as topic and/or sentiment. Manager system 110 can run location process 115 to determine a location of a user who may a user using a computer device 130A-130Z to present and define a pickup request. Manager system 110 can run notification process 116 to output a notification to a user at a user computer device specifying information on pickup of a purchase item according to the scheduled pickup time. Manager system 110 can run machine learning process 117 to examine results data resulting from scheduling processes performed by pickup scheduling process 118 and to adjust pickup scheduling process 118 for improvement of pickup scheduling process 118 via machine learning process 117.

Each of the different user computer devices 130A-130Z can be associated to a different user. In one embodiment manager system 110 can be external to mapping service system 150, weather service system 160 and to newsfeed system 170 and to each of the one or more user computer device 130A-130Z. In one embodiment manager system 110 can be co-located with one or more user computer device 130A-130Z. Manager system 110 in one embodiment can be operated by a common organizational entity that operates venue 140.

Regarding computer devices 130A-130Z, computer devices 130A-130Z can computing node based devices provided by a client computer, e.g. a mobile device, e.g. a smartphone or tablet, a laptop or PC that runs one or more program including a web browser for browsing web pages.

Manager system 110 can be operative to run a preparation and maintenance process 111, a pickup request process 113, a natural language processing (NLP process) 114, a location process 115, a notification process 116, a machine learning process 117, and a pickup scheduling process 118.

Figure 2:
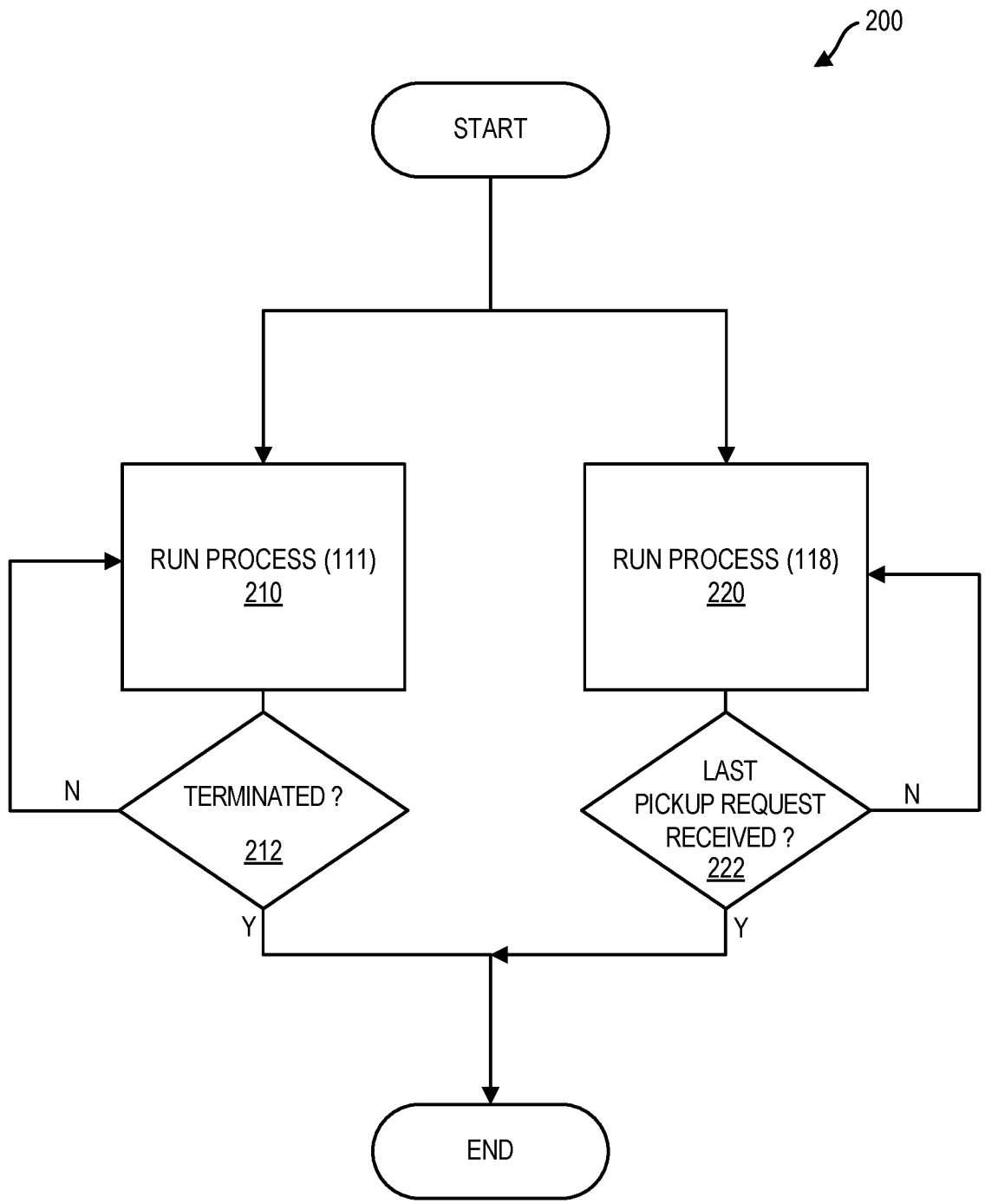
FIG. 2 is a flowchart illustrating a method for use in performance of pickup order processing in one embodiment.

FIG. 2 depicts a flowchart of illustrating coordination of processes that can be performed by manager system 110 of FIG. 1, in accordance with one or more embodiments set forth herein.

At block 210, manager system 110 can run preparation and maintenance process 111 to populate prepare and maintain various data of data repository 112 for use by pickup scheduling process 118. manager system 110 can run preparation and maintenance process 111 to populate prepare and maintain various data of data repository 112 including data of shopping research history area 2122, order pickup history area 2123, purchase items area 2124, and workforce schedule area 2125. Manager system 110 can run preparation and maintenance process 111 iteratively until process 111 is terminated at block 212.

At block 220, manager system 110 can run pickup scheduling process 118 to determine a schedule for reception of a purchase item by a customer user, e.g. by pickup by a customer user. Manager system 110 can run pickup scheduling process 118 iteratively until process 118 is terminated at block 222. Manager system 110 can run preparation and maintenance process 111 and pickup scheduling process 118 concurrently and can run each of process 111 and process 118 iteratively.

For performance of preparation and maintenance process 111, manager system 110 can be configured to automatically process, e.g. by running of NLP process 114, messages that are generated by activities of customer users. Activities can include e.g. communication between a venue operator and customer where a customer is requested to provide assistance with a venue workload, shopping activities such as online shopping browsing sessions or in retail venue visits, purchase activities, e.g. on line or in venue, and/or survey history activities. Manager system 110 can be in communication with a variety of sources for receipt of messages generated by activities of customer users and/or venue personnel, e.g. a messaging system used for communication between customer and venue operator, a computing node based venue system of venue 140 and venue systems of other venues, and customer computer devices 130A-130Z, and/or one or more website hosting server of manager system 110 which can host a website for facilitation of on-line shopping, purchases, and/or surveys. Messages subject to processing can include e.g. text strings which may formatted in various file formats, e.g., webpage forms.

For performance of preparation and maintenance process 111, manager system 110 can be configured to automatically process, e.g. by running of NLP process 114, messages that are received by the organizational entity operating manager system 110 and venue 140. For example, manager system 110 for populating data into area 2124 can request and receive messages from various data sources respecting inventory items available for purchase. Such messages can include e.g. descriptive content, e.g. product specification, user manual and instruction manual documents, from suppliers of purchased items that are made available for purchase by the operator of manager system 110 and venue 140. Such messages can include e.g. descriptive content, e.g. product review postings from publicly accessible websites such as product review websites and social media websites. On receipt of messages specifying information of inventory products for purchase manager system 110 can run NLP process 114 to determine an attribute such as a topic classifier for a purchase item for purchase. Manager system 110 for populating data into area 2124 can receive messages from various data sources such as schedule ledgers maintained by venue managers and messages transmitted from computer devices of venue personnel.

In one embodiment manager system 110 for performance of block 210 can instantiate structured data records in areas 2122-2125 that are adapted for use by pickup scheduling process 118. Manager system 110 can be configured so that manager system 110 automatically monitors for "activities" of a customer use and stores an activity record for each activity in one or more of area 2122-2123. An activity can be a shopping activity e.g. a browsing session on a venue website or an in venue visit, wherein a user may spend time resources in researching a particular product. Records for such activities can be stored in area 2122. Activities can include activities wherein a user orders a purchase item for reception for pickup and then proceeds to pick up the purchase item for pickup. Records for such activities can be stored in area 2123. A record for an activity prepared by manager system can include e.g. a Customer ID, ID=001, and classification information return by subjecting a message generated by performance of the activity to NLP processing by running of NLP process 114, e.g. topic and/or sentiment classifications of generated messages. In area 2124 data repository 112 can store purchase item records for purchase items made available for purchase by an operator of manager system 110 and venue 140. Records for a certain purchase item can include a record for each of several messages received for certain message. Each purchase item record can include one or more topic classifier. Data repository 112 can store such activity and purchase item records in addition to or in place of underlying unstructured message content subject to processing for record generation. In one embodiment, data repository 112 can be configured to initialize responsively to being populated with a threshold amount of data having specified attributes.

Figure 3:
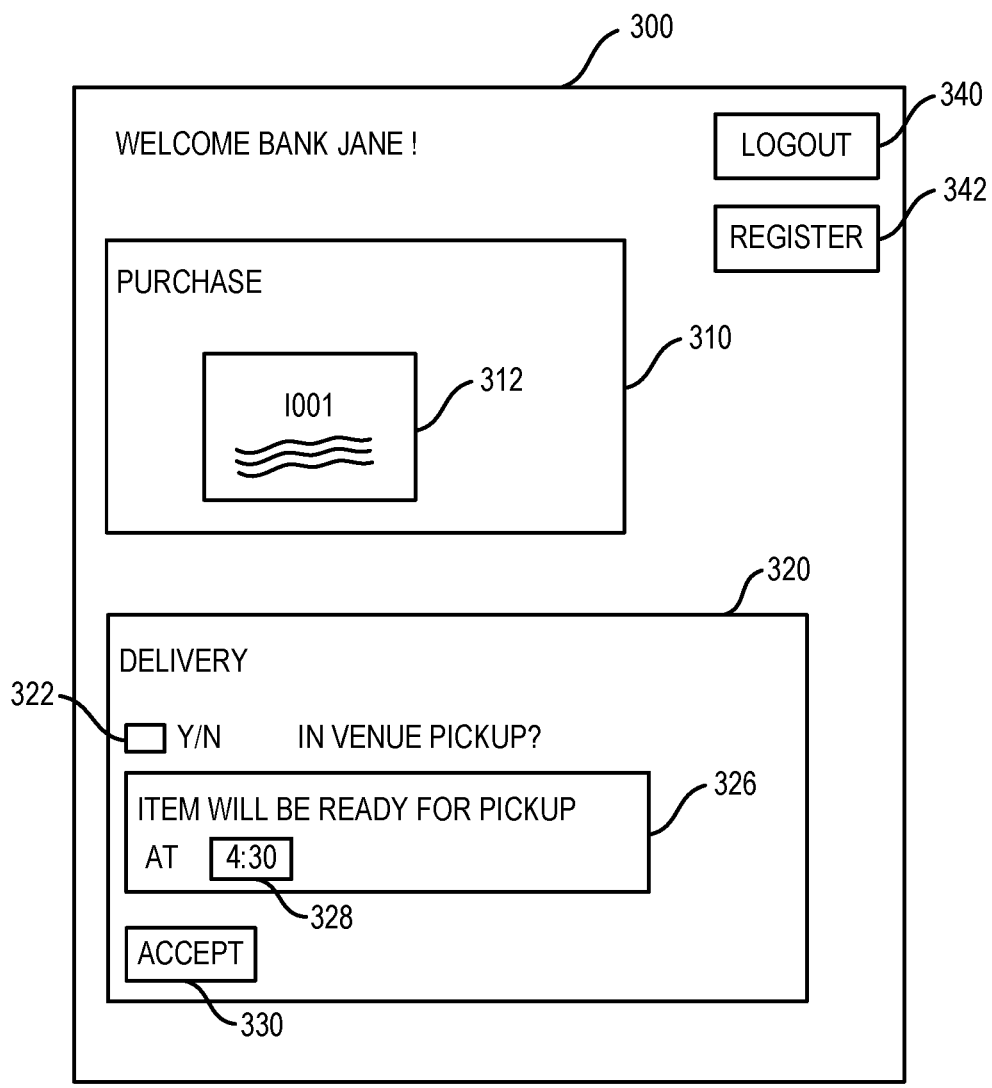
FIG. 3 depicts a user interface for requesting a pickup in one embodiment.

In one embodiment, manager system 110 can activate pickup request process 113 to output the user interface 300 as set forth in FIG. 3. User interface 300 can be a manually operated user interface for display on the display of a computer device e.g. a computer device of computer device 130A-130Z. User interface 300 can be provided by a webpage form that allows a user to log on to webpage server of manager system 110. User interface 300 allows a user to define item reception requests provided by pickup requests for purchase items designated for purchase. In area 310 user interface 300 can display information on a purchase item designated for purchase. For example, in area 312 user interface 300 can display the serial number for an item for purchase as well as text based, image based (including video) description of a designated item for purchase. Using area 320 a user can use user interface 300 to define a request for in-venue pickup. For example, by selecting box 322 a user can define a request that the purchase item specified in area 320 should be picked up in a venue. Manager system 110, on processing the request for in-venue pickup can display e.g. in area 328 a scheduled time for pickup. Manager system can display a variable text based message specifying details of a pickup in area 326. Manager system 110 can activate pickup scheduling process 118 for determining a scheduled pickup time for pickup as displayed in area 328. Using button 330 of user interface 300, a user can accept a proposed delivery time as determined by pickup scheduling process 118. A user can register a registered user of manager system 110 using area 342 and can log out using area 340.

In one embodiment, manager system 110 can run pickup scheduling process 118 to determine a pickup scheduling time using first-in, first-out (FIFO) logic. For example, referring to Table A showing a workforce schedule illustrating workforce capacities of a retail venue 140, pickup scheduling process 118 in one embodiment can allocate to the current purchase item pickup request the first available timeslot for servicing and supporting the pickup. For example, referring to Table A, Alice is available to support the pickup at 3:30-4:00. Manager system 110 running pickup scheduling process 118 using FIFO logic can select the timeslot of 3:30-4:00 as the scheduled pickup time, based on Alice's availability during that timeslot.

TABLE A

| TIME SLOT | CAPACITY |
| --- | --- |
| 3:00-3:30 | — |
| 3:30-4:00 | Alice Available |
| 4:00-4:30 | — |
| 4:30-5:00 | Bob Available |
| 5:00-5:30 | — |

Embodiments herein recognize potential problems involving network utilization using FIFO logic for purposes of determining pickup delivery time. For example, the user making the request in which Alice is scheduled to support pickup at 3:30, may not be able to arrive at the venue until after 4:00 but may accept the proposed delivery time in any event. At arrival of the venue, the user making the pickup request may not be serviced properly. In another scenario, the user defining the pickup request may reject the proposed delivery time and thus system 100 may fail to fulfill the request. At the same time, a second user, user 002, may make a request but may only be able to arrive at the store for pickup at the timeslot reserved for the first user, user 001. In such a scenario, system 100 can also fail to fulfill a request.

Embodiment herein recognize that a variety of a variety of problems arise in the realm of computer networks operating in an area occupied by a plurality of users capable of communicating with a network. Embodiments herein recognize that on the occurrence of events commonly experienced by multiple users at a common time, the multiple users may make concurrent demands on the network to overload the network and frustrate the function of relied on services. Embodiments herein recognize that on outputting of notifications by the network to multiple users traffic patterns can be affected in significant ways giving rise to health risks, safety risks, and infrastructure building layout designed concerns.

Embodiments herein recognize that interactions between a computer network and a user of the computer network are fundamental to the operation of the computer network. For example if information presented to a user is inaccurate or misaligned to a user's state of attention, the user can disengage from the network leading to a range of problems. Computing resources will be allocated to providing functions not utilized to deliriously effect efficiencies of other services provided. Computing resources may be unnecessary allocated to facilitate an unnecessary session termination process and additional computing resources to facilitate an unnecessary re-login process and an unnecessary re-authentication process. Embodiments herein recognize that a user interfacing with a computer network can be expected to disengage of presented with information that is inaccurate or misaligned to a current state of attention of a user, e.g., if the user is presented an opportunity for pickup not possibly achievable.

In reference to Equation 1 below manager system 110 in one embodiment can run pickup scheduling process 118 to perform intelligent selection of a purchase item pickup time. In one embodiment, pickup scheduling process 118 can determine pickup time for a purchase item according to the functions set forth in Equation one. Equation one is as follows.

$$P = W1F1 + W2F2 + W3F3 + W4F4 \quad \text{(Equation 1)}$$

Where "P" represents a predicted time of arrival based on multiple factors, "F1" is a first factor for predicting time of arrival, "F2" is a second factor for predicting time of arrival, "F3" is a third factor for predicting time of arrival, and "F4" is a fourth factor for predicting time of arrival. Manager system 110 running pickup scheduling process 118 can independently predict time of arrival of a user making a pickup request using a plurality of different factors according to a weighting scheme e.g. a predetermined weighting scheme or a dynamically variable weighting scheme. In further reference to Equation 1, "W1-W4" are weights associated to the different factors. In one embodiment the first factor "F1" is an arrival time predicting factor based on current location of the current user making a pickup request, "F2" is an arrival time predicting factor based on shopping research history of the current user who is defined a purchase item pickup request, "F3" is an arrival time predicting factor based on an order pickup history of the current user who has entered a purchase item pickup request, and "F4" is an arrival time predicting factor based on purchase items defined in the current purchase item pickup request currently being processed by manager system 110. The weights of the factors can be selected for avoidance of unlikely results. For example according to factor "F2" taken alone a short time of arrival prediction that can be predicted that is not likely given the user's current location, but if the weight for the factor is sufficiently light the factor can appropriate bias the cumulative factor time of arrival prediction P to yield a time of arrival prediction P that is accurate and not unlikely. In one example, the weight "W1" of factor "F1" can be restricted to a range of 0.60 and 0.90, and weights "W2-W4" of remaining factors to the range of 0.15 and 0.05 with the sum of the weights totaling 1.0 for each iteration. According to machine learning process 117 manager system 110 can vary weights of factors within the restricted ranges and results can be subject to examining to bias the weights used for iterations in favor of weight profiles determined by the examining to yield accurate results.

Figure 4:
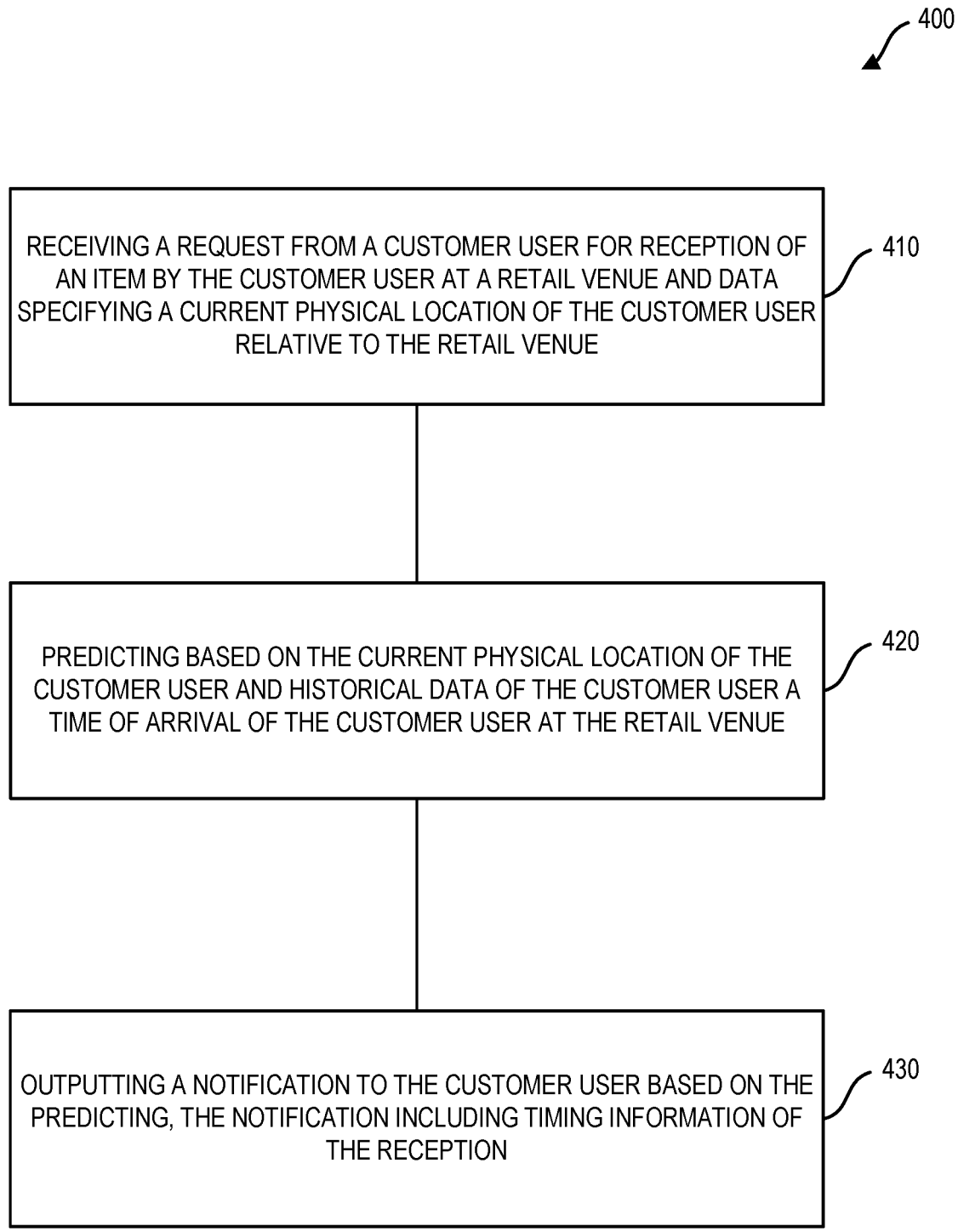
FIG. 4 is a flowchart illustrating a method for use in performance of pickup order processing in one embodiment.

In one embodiment, manager system 110 can perform method 400 as set forth in FIG. 4. At block 410 manager system 110 can perform receiving a request from a customer user for reception of an item by the customer user at a retail venue and data specifying a current physical location of the customer user relative to the retail venue. At block 420, manager system 110 can perform predicting, based on the current physical location of the customer user and historical data of the customer user, a time of arrival of the customer user at the retail venue. At block 430, manager system 110 can perform outputting a notification to the customer user based on the predicting, the notification including timing information of the reception.

Figure 5:
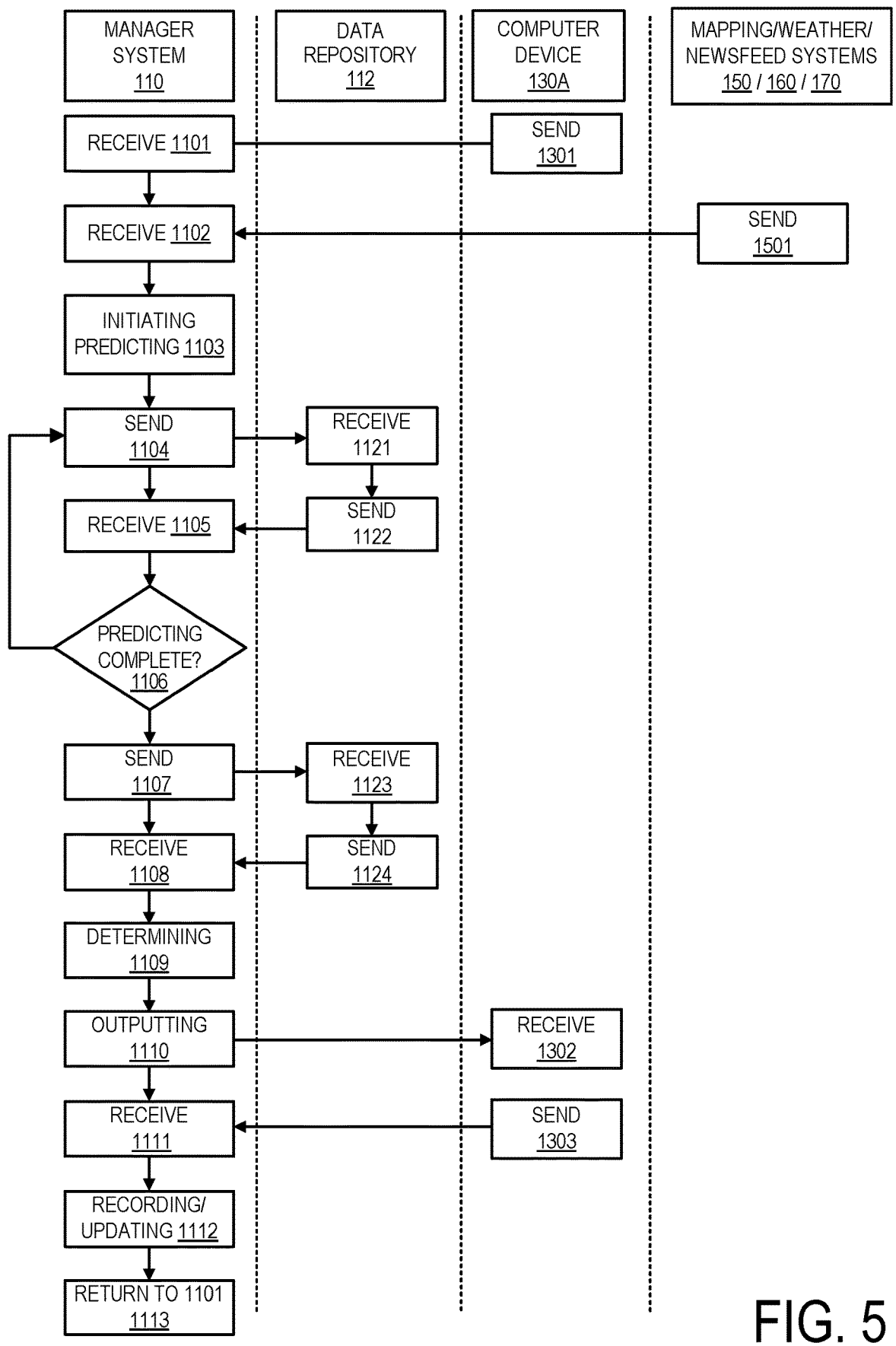
FIG. 5 is a flowchart illustrating a method for use in performance of pickup order processing in one embodiment.

Specific embodiment of manager system 110 performing method 400 is set forth in reference to the flowchart of FIG. 5 illustrating a method performed by system 100 from the perspective of manager system 110, its associated data repository 112, a computer device 130A-130Z, and mapping service, weather service, and newsfeed systems 150, 160, and 170.

At block 1301, computer device 130, used by a first user e.g. user 001, at computer device 130 can send a request for pickup of a specified purchase item, the request can be defined using the user interface 300 as set forth in FIG. 3. At block 1101, manager system 110 can receive a defined purchase item pickup request. At block 1102, manager system 110 can receive information from one or more of mapping service system 150, weather service system 160, or newsfeed system 170 sent by one or more of mapping service system 150, weather service system 160, or newsfeed system 170 at block 1501.

At block 1103, manager system 110 can initiate predicting of a time of arrival of user 001 at retail venue 140 and can perform determining at blocks 1103-1106. As indicated by send and receive blocks 1104 and 1105, performed by manager system 110, and receive and send blocks 1121 and 1122 performed by data repository 112, manager system 110 can make multiple data requests from data repository 112 during performance of a predicting. Performing predicting of arrival time manager system 110 can use data received at blocks 1101 and 1102 as well as previously prepared data of data repository 112 e.g. as prepared by iteratively run preparation maintenance process 111 as set forth herein. For performance of predicting a time of arrival of a current user, user 001, manager system 110 can perform predicting according to the various factors "F1-F4" as set forth in Equation 1 and can weight the factors for determination of an overall time of arrival value.

For predicting based on the "F1" location factor of Equation 1, manager system 110 can activate location process 115 to determine a location of the user at the time the pickup request is defined and entered at the time the pickup request is received by manager system 110. In one embodiment, manager system 110 can read GPS data of computer device 130A received at block 1101 to determine a location of computer device 130A, however other technologies for determination of the user's location can be utilized. For example, examining addresses associating with messages containing received data, manager system 110 can determine that a request was defined at the home of user 001 and can cross-reference and determine the location of user 001 by lookup to the home address of user 001. Locating technologies that do not rely on GPS data can be utilized. For example, locating technologies can include IEEE 802.11 locating technologies and/or cellular network based locating technologies.

In one embodiment, for predicting time of arrival based on location according to factor "F 1", manager system 110 can maintain a lookup table that correlates locations from venue to travel time. In one embodiment, for predicting time of arrival based on location, manager system 110 can utilize mapping service system 150. Manager system 110 can send data to mapping service system 150 specifying a location of a user and mapping service system 150 can return an arrival time based on a variety of factors that take into account current conditions such as, weather related conditions, traffic conditions, and the like. Mapping service system 150 can be in communication with weather service system 160 and newsfeed system 170 to determine information on weather and traffic conditions. In one embodiment, manager system 110 can be directly in communication with weather service system 160 and/or newsfeed system 170 to predict a time of arrival of user 001 based on data received from mapping service system 150 received using location information of a current user and data received from weather service system 160 and/or newsfeed system 170. For performing predicting according to the "F2" factor based on shopping research history data, manager system 110 can use data from shopping research history area 2122 of data repository 112. For predicting according to the "F3" factor based on order pickup history data, manager system 110 can use data from order pickup history area 2123 of data repository 112 for the current user. For performing predicting according to the "F4" factor, manager system 110 can use data of purchase items area 2124 of data repository 112.

Regarding factor F1, manager system 110 can generally predict an arrival time of a user using artificial intelligence processing and the predicting can be refined using artificial intelligence by factors F2-F4. Regarding factor F2, shopping history research history data can be examined. Records of shopping research history area 2122 can be instantiated using various software tools that permit on line shopping patterns to be analyzed. Using web analytics tools such as IBM Digital Analytics™ or Google Analytics™ activity records can be instantiated in area 2122 that indicate that the shopper has exhibited a research activity level above a threshold level for a current product for purchase. Activity records indicating activity research can include e.g. activity records indicating browsing information on the product again and again, browsing activity involving review of comments, browsing activity involving review of price information. Regarding factor F3, order pickup history data can be examined. Records of order pickup history area 2123 can be instantiated to include records specifying a speed of arrival for past pickup orders in relation to scheduled pickup times. Manager system 110 can determine at a user is an eager buyer where the user exhibits the behavior of arriving on time for product delivery pickup, and for performance of such determining can e.g. allocate higher scores to records indicating a user arrived ahead of schedule and lower scores to records indicating that a user arrived at a venue behind schedule for the pickup of a purchased product. Regarding factor F4, purchase item data can be examined. Records of order pickup history area 2123 can be instantiated e.g. using NLP process 114 to include records specifying topics of purchase items subject to purchase, e.g. "vehicle repair", "holiday gift". Manager system 110 can maintain a scoring lookup table that associates purchase item topics to urgency scores with higher urgency scores indicating higher urgency, e.g. TOPIC="healthcare"=Score 10; TOPIC="vehicle repair"=Score 9; TOPIC="vehicle maintenance"=Score 5; TOPIC="holiday gift"=Score 3. Managing system 110 can use the described lookup table and topic classifications to predict a time of arrival.

On determining at block 1106 that predicting is complete, manager system 110 can proceed to blocks 1107 and 1108 as set forth in the flowchart of FIG. 5. At block 1107, manager system 110 can make a request for data of data repository 112 received by data repository at block 1123 and with returned data of data repository 112 sent to manager system 110 at block 1124 for receipt by manager system 110 at block 1108. Data received at block 1108 can be data of area 2125 of data repository 112 regarding a workforce schedule of a current workforce of retail venue 140, e.g. including workforce schedule data as set forth in Table A.

Manager system 110 can perform determining of a pickup time based on predicted time of arrival of the current user, user 001 and additional data. The additional data can be e.g. the data of workforce schedule area 2125, e.g. workload capacity information of a venue including staffing schedules for a venue. For performing of determining at block 1109, manager system 110 can perform matching to match the predicted time of arrival "P" to the timeslot of Table A that matches the predicted time of arrival "P" according to a best match criteria. For example, if the predicted time of arrival of the current user 001 is 4:35, manager system 110 at block 1109 can select the timeslot 4:30-5:00 in which staffing and support by Bob is available, as the selected timeslot and based on the selecting can perform determining at block 1109 to determine a pick up time of 4:30-5:00. It is seen therefore, that manager system 110 by performing processing as set forth herein can avoid problems associated with FIFO processing as set forth herein. According to FIFO logic processing the current user, user 001, would be sourced to the 3:30 timeslot for pickup which would increase a likelihood of the current user disengaging with system 100.

At block 1110, manager system 110 can perform outputting a notification to computer device 130A for receipt by computer device 130A at block 1302. Manager system 110 can perform outputting at block 1110 based of the determining at block 1109 accordingly based on the predicting at blocks 1103-1106. In one example of manager system 110 performing outputting at block 1110 manager system 110 at block 1110 can output for display on user interface 300 as set forth in FIG. 3 text indicating the determined timeslot for pickup determined at block 1109. According to the outputting at block 1110 text indicating the determined time for pickup can be displayed in area 328 of user interface 300. User 001 using user interface 300 can accept the proposed pickup time by activation of accept button 330. Responsively to the current user, user 0001 accepting, computer device 130 at block 1303 can send data indicating the acceptance to manager system 110 for receipt by manager system 110 at block 1111.

At block 1112, manager system 110 can perform recording and updating of data of data repository 112 e.g. can update results area 2126 of data repository 112. For updating results area 2126, manager system 110 can examine results obtained by performance of scheduling events determined by activation of pickup scheduling process 118. In one example, manager system 110 at block 1112 can examine location of computer devices of users e.g. computer devices 130A-130Z with predicted times of arrival to determine the accuracy of previously made predictions as to times of arrival in retail venue 140 of users of manager system 110 who have made prior pickup requests. During iterations of use of Equation 1, manager system 110 can be dynamically adjusting weights "W1-W4" used in Equation 1 within valid ranges. Manager system 110 at block 1112 record in weight profiles area 1127 weight profiles (e.g. the set of weight values W1-W4 used) for iterations of user of Equation 1 that rendered predictions of user arrival times that were determined to have accuracy above a threshold accuracy e.g. differed from the predicted time by less than a threshold percent and inaccuracy above a threshold accuracy e.g. differed from the predicted time by more than a threshold percent. Manager system 110, in one embodiment for each iteration in which Equation 1 is used for predicting an arrival time "P" can bias the weights "W1-W4" of Equation 1 based on data of weight profiles area 2127 stored at data repository 112, e.g. can bias the weights W1-W4 in favor of weight profiles yielding accurate results and away from weight profiles yielding inaccurate results. As indicated by return block 113 manager system 110 can return to block 1102 on completion of block 1112.

Certain embodiments herein may offer various technical computing advantages, involving computing advantages to address problems arising in the realm of computer networks such as involving computer network to user interfacing wherein inaccurate information or misalignment with a user's attention state can yield user disengagement and wasted and unnecessary computing resource expenditures. Embodiments herein recognize that interactions between a computer network and a user of the computer network are fundamental to the operation of the computer network. For example if information presented to a user is inaccurate or misaligned to a user's state of attention, the user can disengage from the network leading to a range of problems. Computing resources will be allocated to providing functions not utilized to deliriously effect efficiencies of other services provided. Computing resources may be unnecessary allocated to facilitate an unnecessary session termination process and additional computing resources to facilitate an unnecessary re-login process and an unnecessary re-authentication process. Embodiments herein recognize that a user interfacing with a computer network can be expected to disengage of presented with information that is inaccurate or misaligned to a current state of attention of a user, e.g., if the user is presented an opportunity for pickup not possibly achievable. Embodiments herein can provide results and advantages that are not possible or practical without use of components of a technical computing environment, such systematically automatically and in real time evaluating data from a plurality of data sources, some of which can include records of user behavior over time. Embodiments herein can include artificial intelligence processing platforms featuring improved processes to transform unstructured data into structured form permitting computer based analytics and predictive decision making. Embodiments herein also can include machine learning platforms that leverage historical data for improved predictive analytics. Machine learning platforms can improve accuracy of artificial intelligence decision making while reducing reliance on rules based criteria for processing. Machine learning platforms as set forth herein can accordingly increase accuracy while reducing processing complexity and computational overhead. Embodiment herein recognize that a variety of a variety of problems arise in the realm of computer networks operating in an area occupied by a plurality of users capable of communicating with a network. Embodiments herein recognize that on the occurrence of events commonly experienced by multiple users at a common time, the multiple users may make concurrent demands on the network to overload the network and frustrate the function of relied on services. Embodiments herein recognize that on outputting of notifications by the network to multiple users traffic flow patterns can be affected in significant ways giving rise to health risks, safety risks, and infrastructure building layout designed concerns. Embodiments herein can feature intelligent management of notification to users for reduction of risks associated with concurrent demands for network utilization by multiple users and traffic flow to from and within a venue.

Figure 6:
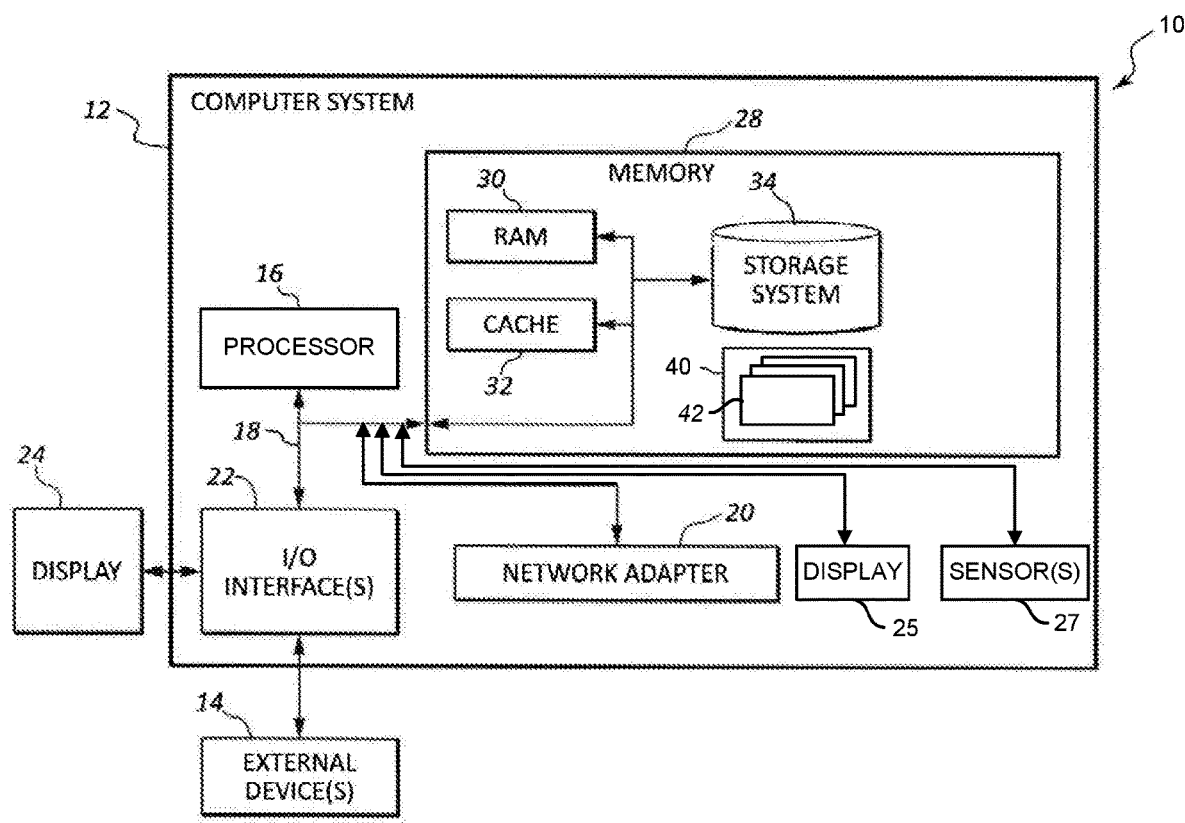
FIG. 6 depicts a computing node according to one embodiment.
Figure 7:
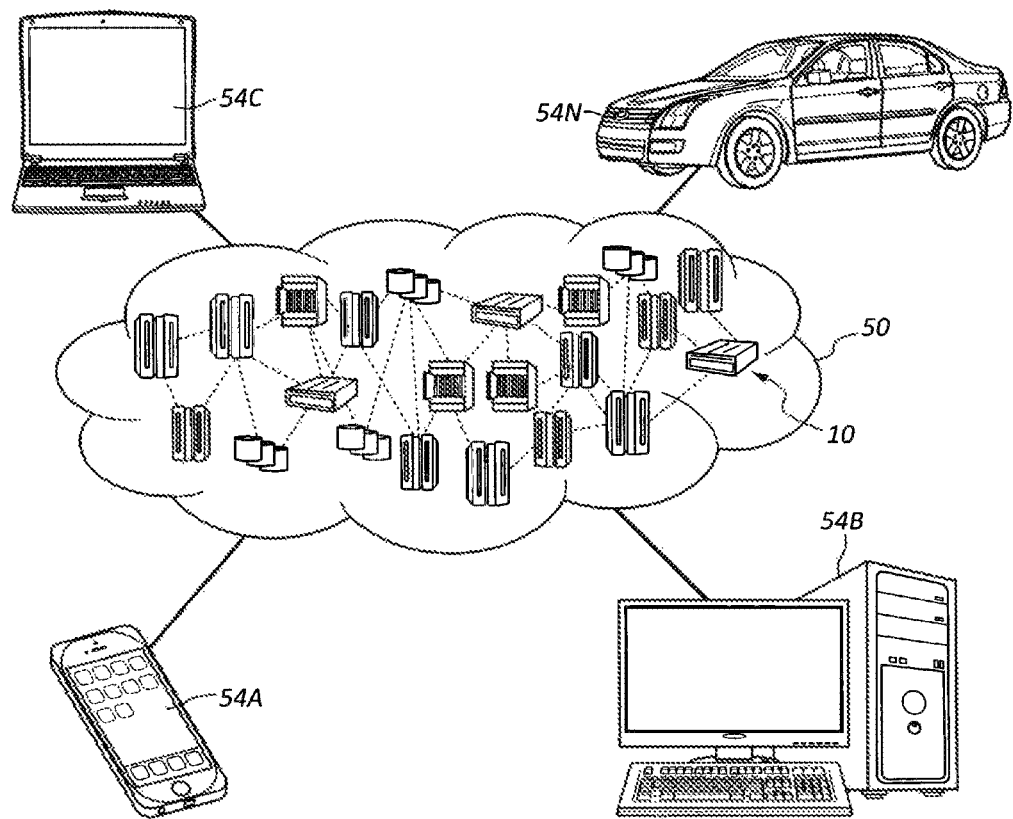
FIG. 7 depicts a cloud computing environment according to one embodiment.
Figure 8:
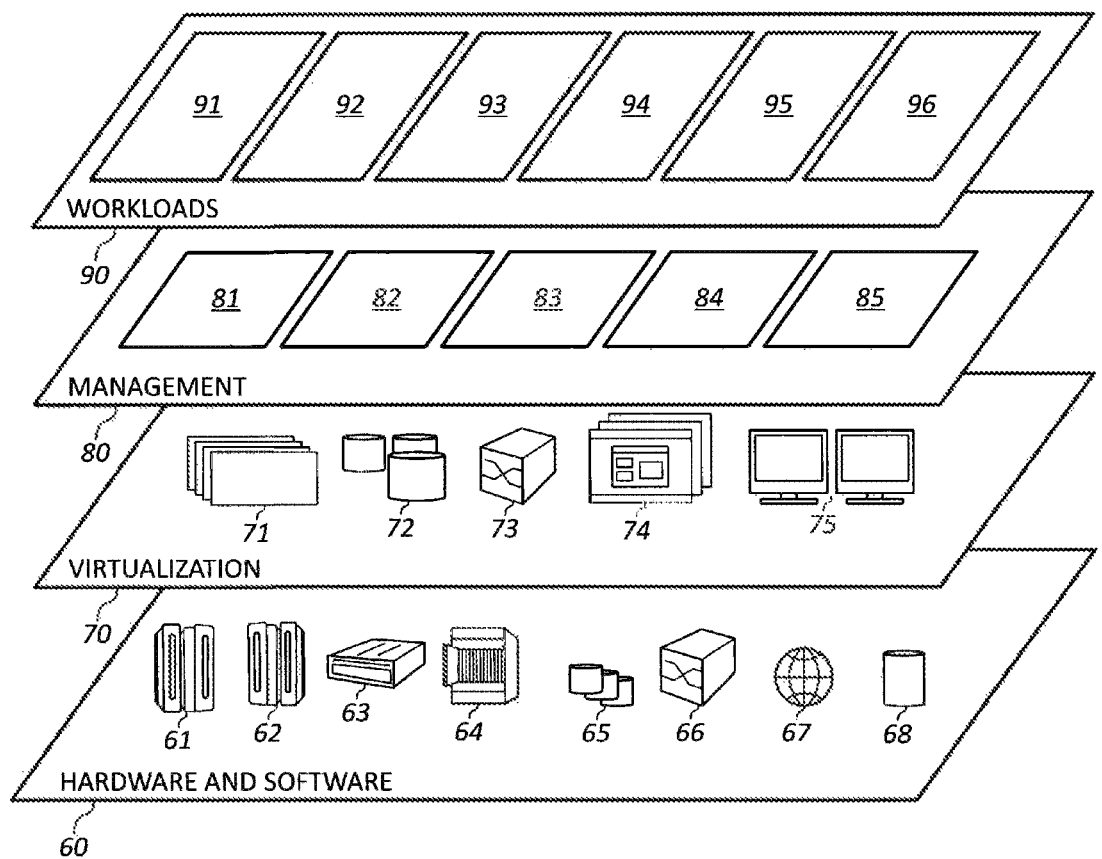
FIG. 8 depicts abstraction model layers according to one embodiment.

FIGS. 6-8 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 6, computer system 12 in computing node 10 is shown in the form of a general-purpose computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 7-8.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to method 200 of FIG. 2, for performing functions described with reference to method 400 of FIG. 4, and the functions described with reference to manager system 110 as set forth in the flowchart of FIG. 5. In one embodiment, systems 150-170 can include one or more computing node 10 and can include one or more program 40 for performing functions described with reference to systems 150-170 as set forth in the flowchart of FIG. 5. In one embodiment, one or more user computer device 130A-130Z can include one or more computing node 10 and can include one or more program 40 for performing functions described with reference to user computer device 130A as set forth in the flowchart of FIG. 5.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 7 computing node 10 is described as being implemented in a cloud computing environment and accordingly is referred to as a cloud computing node in the context of FIG. 7.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for time of arrival predicting and purchase item pickup scheduling as described herein. The processing components 96 can be implemented with use of one or more program 40 described in FIG. 6.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
receiving, by one or more processor, a request from a customer user device for reception of an item by a customer user of the customer user device at a retail venue and Global Positioning System (GPS) data specifying a current physical location of the customer user relative to the retail venue;
predicting, by the one or more processor, based on the current physical location of the customer user and historical data of the customer user a time of arrival of the customer user at the retail venue; and
outputting, by the one or more processor, a notification to the customer user based on the predicting, the notification including timing information of the reception, wherein the predicting includes receiving from a device defining a data source a data message that includes a product specification of the item and processing by Natural Language Processing the product specification to determine a topic of the item, wherein the predicting includes performing the predicting according to a function based on a combination of weighted factors, wherein weighted factors of the combination of weighted factors include each of: (a) a location factor based on a current physical location of the customer user, (b) a shopping research history factor based on a history of product research performed by the customer user on the item, (c) an order history factor based on history of purchase item pickups by the user, and (d) a purchase item factor based on the topic of the item as determined by the Natural Language Processing.

2. The method of claim 1, wherein the historical data includes one or more of the following selected from the group consisting of data of online shopping behavior of the customer user, data of in store shopping behavior of the customer user, and data of delivery pickups of the customer user.

3. The method of claim 1, wherein the outputting includes performing the outputting based on a matching of the time of arrival as determined by the predicting to a staffed timeslot characterized by the retail venue being staffed to support the reception by the customer user.

4. The method of claim 1, wherein the method includes performing a machine learning process that performs examining results yielded by instances of performing the predicting and adjusting the predicting based on the examining, wherein the examining includes comparing an actual time of arrival of the customer user to a predicted time of arrival of the customer user.

5. The method of claim 1, wherein the item defines a purchase item, wherein the predicting is further based on a purchase item factor, wherein a predicting of a time of arrival of the customer user according the purchase item factor includes determining a topic of the purchase item, looking up an urgency score from a lookup table correlating urgency scores with topics of purchase items, wherein the method includes subjecting a message specifying the purchase item to processing by a Natural Language Processing (NLP) process to determine a topic of the purchase item.

6. The method of claim 1, wherein the method includes monitoring the retail venue for arrival of the customer user, examining an accuracy of the predicting based on an actual time of arrival of the customer user as compared to a predicted time of arrival of the customer user, and adjusting a subsequent iteration of the predicting based on the examining.

7. The method of claim 1, wherein the predicting, by the one or more processor, based on the current physical location of the customer user and historical data of the customer user, a time of arrival of the customer user at the retail venue includes using historical data of the customer user stored in a data repository, the historical data of the customer user stored in a data repository comprising online shopping behavior data of the customer user.

8. The method of claim 1, wherein the predicting, by the one or more processor, based on the current physical location of the customer user and historical data of the customer user, a time of arrival of the customer user at the retail venue includes using historical data of the customer user stored in a data repository, the historical data of the customer user stored in a data repository comprising in store shopping behavior data of the customer user.

9. The method of claim 1, wherein the item for reception by the customer user defines an item for pickup by the customer user, wherein the receiving, by one or more processor, a request from a customer user includes receiving data that has been input into a customer user interface presented to the customer user, wherein the customer user interface includes a first area that displays information on a purchase item that has been designated for purchase and a second area that allows the customer user to define the request, and a third area that displays textual information specifying a scheduled time for pickup of the item for pickup by the customer user, wherein the item for reception by the customer user defines an item for pickup by the customer user, wherein the predicting, by the one or more processor, based on the current physical location of the customer user and historical data of the customer user, a time of arrival of the customer user at the retail venue includes using historical data of the customer user stored in a data repository, the historical data of the customer user stored in a data repository comprising online shopping behavior data of the customer user, the historical data of the customer user stored in a data repository further comprising in store shopping behavior data of the customer user.

10. The method of claim 1, wherein the item for reception by the customer user defines an item for pickup by the customer user, wherein the receiving, by one or more processor, a request from a customer user includes receiving data that has been input into a customer user interface presented to the customer user, wherein the customer user interface includes a first area that displays information on a purchase item that has been designated for purchase and a second area that allows the customer user to define the request, and a third area that displays textual information specifying a scheduled time for pickup of the item for pickup by the customer user.

11. A computer program product comprising:
a computer readable storage medium readable by one or more processing unit and storing instructions for execution by one or more processor for performing a method comprising:
receiving a request from a customer user device for reception of an item by a customer user of the customer user device at a retail venue and Global Positioning System (GPS) data specifying a current physical location of the customer user relative to the retail venue;
predicting based on the current physical location of the customer user device and historical data of the customer user a time of arrival of the customer user at the retail venue; and
outputting a notification to the customer user based on the predicting, the notification including timing information of the reception, wherein the predicting includes receiving from a device defining a data source a data message that includes a product specification of the item and processing by Natural Language Processing the product specification to determine a topic of the item, wherein the predicting includes performing the predicting according to a function based on a combination of weighted factors, wherein weighted factors of the combination of weighted factors include each of: (a) a location factor based on a current physical location of the customer user, (b) a shopping research history factor based on a history of product research performed by the customer user on the item, (c) an order history factor based on history of purchase item pickups by the user, and (d) a purchase item factor based on the topic of the item as determined by the Natural Language Processing.

12. A system comprising:
a memory;
at least one processor in communication with the memory; and
program instructions executable by one or more processor via the memory to perform a method comprising:
receiving a request from a customer user device for reception of an item by a customer user of the customer user device at a retail venue and data specifying a current physical location of the customer user relative to the retail venue;
predicting based on the current physical location of the customer user and historical data of the customer user a time of arrival of the customer user at the retail venue; and
outputting a notification to the customer user based on the predicting, the notification including timing information of the reception, wherein the predicting includes receiving from a device defining a data source a data message that includes a product specification of the item and processing by Natural Language Processing the product specification to determine a topic of the item, wherein the predicting includes performing the predicting according to a function based on a combination of weighted factors, wherein weighted factors of the combination of weighted factors include each of: a location factor based on a current physical location of the customer user, and a purchase item factor based on the topic of the item as determined by the Natural Language Processing.

13. The system of claim 12, wherein the item for reception by the customer user defines an item for pickup by the customer user, wherein the receiving, by one or more processor, a request from a customer user includes receiving data that has been input into a customer user interface presented to the customer user, wherein the customer user interface includes a first area that displays information on the item for pickup and a second area that allows the customer user to define the request, and a third area that displays textual information specifying a scheduled time for pickup of the item for pickup by the customer user, wherein the historical data includes data of delivery pickups of the customer user stored in a data repository, wherein the predicting includes examining the historical data of delivery pickups of the customer user so that the predicted time of arrival is a first time in the case that for historical pickups of the customer user, the customer user exhibited a behavior of arriving on time and further so that the predicted time of arrival is a second time in the case that for historical pickups the of the customer user the customer user exhibited a behavior of arriving late, the first time being earlier than the second time.

14. The system of claim 12, wherein the item for reception by the customer user defines an item for pickup by the customer user, wherein the receiving, by one or more processor, a request from a customer user includes receiving data that has been input into a customer user interface presented to the customer user, wherein the customer user interface includes a first area that displays information on a purchase item that has been designated for purchase and a second area that allows the customer user to define the request, and a third area that displays textual information specifying a scheduled time for pickup of the item for pickup by the customer user, wherein the item for reception by the customer user defines an item for pickup by the customer user, wherein the predicting, by the one or more processor, based on the current physical location of the customer user and historical data of the customer user, a time of arrival of the customer user at the retail venue includes using historical data of the customer user stored in a data repository, the historical data of the customer user stored in a data repository comprising online shopping behavior data of the customer user, the historical data of the customer user stored in a data repository further comprising in store shopping behavior data of the customer user.

15. The system of claim 12, wherein the item for reception by the customer user defines an item for pickup by the customer user, wherein the receiving, by one or more processor, a request from a customer user includes receiving data that has been input into a customer user interface presented to the customer user, wherein the customer user interface includes a first area that displays information on a purchase item that has been designated for purchase and a second area that allows the customer user to define the request, and a third area that displays textual information specifying a scheduled time for pickup of the item for pickup by the customer user.

16. The system of claim 12, wherein the outputting includes performing the outputting based on a matching of the time of arrival as determined by the predicting to a staffed timeslot characterized by the retail venue being staffed to support the reception by the customer user.

17. The system of claim 12, wherein the method includes performing a machine learning process that performs examining results yielded by instances of performing the predicting and adjusting the predicting based on the examining, wherein the examining includes comparing an actual time of arrival of the customer user to a predicted time of arrival of the customer user.

18. The system of claim 12, wherein the item defines a purchase item, wherein the predicting is further based on a purchase item factor, wherein a predicting of a time of arrival of the customer user according the purchase item factor includes determining a topic of the purchase item, looking up an urgency score from a lookup table correlating urgency scores with topics of purchase items, wherein the method includes subjecting a message specifying the purchase item to processing by a Natural Language Processing (NLP) process to determine a topic of the purchase item.

19. The system of claim 12, wherein the method includes monitoring the retail venue for arrival of the customer user, examining an accuracy of the predicting based on an actual time of arrival of the customer user as compared to a predicted time of arrival of the customer user, and adjusting a subsequent iteration of the predicting based on the examining.

* * * * *